United States Patent
Vigarie

(12) 
(10) Patent No.: US 6,307,939 B1
(45) Date of Patent: Oct. 23, 2001

(54) METHOD AND EQUIPMENT FOR ALLOCATING TO A TELEVISION PROGRAM, WHICH IS ALREADY CONDITIONALLY ACCESSED, A COMPLEMENTARY CONDITIONAL ACCESS

(75) Inventor: Jean-Pierre Vigarie, Cesson-Sevigne (FR)

(73) Assignees: France Telecom; Telediffusion de France, both of Paris (FR)

( * ) Notice: Subject to any disclaimer, the term of this patent is extended or adjusted under 35 U.S.C. 154(b) by 0 days.

(21) Appl. No.: 09/147,700
(22) PCT Filed: Aug. 19, 1997
(86) PCT No.: PCT/FR97/01502
  § 371 Date: Feb. 19, 1999
  § 102(e) Date: Feb. 19, 1999
(87) PCT Pub. No.: WO98/08341
  PCT Pub. Date: Feb. 26, 1998

(30) Foreign Application Priority Data
Aug. 20, 1996 (FR) .................................................. 96 10302

(51) Int. Cl.[7] .................................................. H04N 7/167
(52) U.S. Cl. .......................... 380/210; 380/211; 713/169; 713/168
(58) Field of Search .................................... 713/169, 168; 380/210, 211

(56) References Cited

U.S. PATENT DOCUMENTS

| | | | | |
|---|---|---|---|---|
| 5,583,937 | * | 12/1996 | Ullrich et al. | 380/20 |
| 6,069,957 | * | 5/2000 | Richards | 380/281 |
| 6,105,133 | * | 12/1998 | Fielder et al. | 713/169 |
| 6,105,134 | * | 7/1998 | Pinder et al. | 713/170 |

\* cited by examiner

*Primary Examiner*—Thomas R. Peeso
*Assistant Examiner*—Todd Jack
(74) *Attorney, Agent, or Firm*—Oblon, Spivak, McClelland, Maier & Neustadt, P.C.

(57) ABSTRACT

A method and an equipment for allocating to a television program, which is already conditionally accessed, a complementary conditional access. The television program is first received by means provided with access entitlements and the control words are restored. Complementary access control messages and complementary entitlement management messages corresponding to a complementary access control system are built up. The initial unmodified television program is rebroadcast, together with the complementary messages related to the complementary access control system.

3 Claims, 7 Drawing Sheets

METHOD AND EQUIPMENT FOR ALLOCATING TO A TELEVISION PROGRAM, WHICH IS ALREADY CONDITIONALLY ACCESSED, A COMPLEMENTARY CONDITIONAL ACCESS

DESCRIPTION

1. Technical Domain

The purpose of this invention is a process and equipment for assigning a complementary conditional access to a television program already in conditional access.

New television systems are accompanied by the use of several conditional access systems. The term "television" is taken in a broad sense including radio broadcast or data broadcast programs. Throughout the rest of this document, a "television system" will be used to refer to technical aspects of the television signal; coding modes for images, sound and data, service descriptions, detailed signal syntax, modulation parameters, etc. A "conditional access system" will be used to denote the set of functions affecting a television signal to express its marketing modes; scrambling methods, functions and syntax of messages related to program marketing modes, etc.

The use of these digital techniques to build up a television signal, either in full (as in standard MPEG2/DVB) or in part (as in the D2-MAC/Packet multiplex packet*****), provides considerable flexibility in the choice of a conditional access system. In particular, it is now possible to make several conditional access signals coexist in the same signal, and this is even one of the important functions to be included when defining a new television system.

This need arises because the conditional access system is of overriding importance for an operator in his program marketing choices, since this type of system must allow him to express his marketing strategy (subscription, pay per view, etc.) and is accompanied with a complete technical environment (commercial user management, electronic program guide, installed terminals, etc.) guaranteeing him control over exclusiveness of his clientele. Similarly, a signal that becomes a multi-service signal naturally also becomes a multi-conditional access system.

The most widespread application of conditional access to a television system concerns the assignment of a conditional access signal to each service transported in a signal. This process is already implicitly used in single-service analog systems (DISCRET, SYSTER, VIDEOCRYPT, CRYPTOVISION systems, etc., in NTSC, PAL or SECAM) and is being generalized to digital multi-service systems; in the MPEG2/DVB standard, this process is called MULTICRYPT. Although it does enable independence of operators responsible for different services within the same signal, it becomes restrictive for users who need several decoders, or several multiple conditional access modules that are plugged into a more general terminal when required, if he wants to access several programs; thus, the MPEG2/DVB standard has defined a common scrambling algorithm and has defined and detailed the concept of a common conditional access interface for the terminals.

A process such as MULTICRYPT is applied at the same time as a television signal encoding function combining an encoder, multiplexer, a scrambler, and means of insertion of conditional access data.

FIG. 1 attached illustrates this process. It diagrammatically shows an operator A supplying a service composed of components 1 and marketing it according to methods 1, and an operator B supplying a service composed of components 2 and marketing it by means of methods 2. Marketing of these components is applied in equipment 10, which is an encoder/scrambler/multiplexer. Blocks 12 and 14 diagrammatically show programs 1 and 2 with their conditional access conditions specific to operators A and B. The resulting television signal is of the MULTICRYPT type.

This embodiment may also be carried out or extended by a transcontrol function that modifies the conditional access level to a previously formed signal. This is illustrated in attached FIG. 2. The television signal composed of programs 1 and 2 with their conditional access systems A and B respectively shown diagrammatically by blocks 12 and 14, is input into a transcontroller 20 controlled by an operator C. This circuit deletes the access conditions A and B to programs 1 and 2 respectively, and replaces them by new access conditions C. The result is two new programs with a conditional access system C, shown diagrammatically by blocks 22 and 24 respectively.

Examples of a transcontroller are described in documents EP-A-0 461 029 and EP-A-0 666 694.

Another process may be used, which enables various commercial populations (in other words different terminals) access to the same program, provided that the various operators concerned have reached an agreement on how to share this service. This process is already used in D2-MAC/Packet and is called SIMULCRYPT in the MPEG2/DVB system, and it consists of associating several different conditional access systems with the same program, each of these systems being under the responsibility of an operator and allowing each operator to define his own marketing policy for the same program. Although strictly speaking this term relates to application of this process to MPEG2/DVB, this association of several conditional access systems to a single program will be referred to as "SIMULCRYPT" in this document for simplification purposes, regardless of the target supporting television system.

A process such as SIMULCRYPT is usually applied at the same time as the television signal encoding function. The purpose of this invention is a process and equipment for assigning data describing marketing through a second conditional access system, for a program that is already marketed through a first conditional access system. This equipment will be called "SIMULCRYPTEUR" throughout the rest of this document, with reference to the SIMULCRYPT process defined in the MPEG2/DVB standard, but it can be adapted to different television systems and different conditional access systems.

2. State of Prior Art

In a television signal, a program associated with a conditional access system makes use of several entities:

components: this refers to information flows representing images, sound, teletext data, etc.; all these components make up the technical aspect of the program and materialize the audiovisual contents themselves; components may be scrambled independently of each other;

access entitlement control message service: this includes all messages usually called ECM messages (Entitlement Control Messages); these messages are composed of data expressing routine marketing conditions for the service to which they are associated and called "access conditions"; consequently, they usually operate in real time due to their synchronization with the current program, particularly in pay per view; data for these messages are permanently compared with entitlements acquired by the terminal user, a positive comparison triggering access to the program by unscrambling the selected components; the ECM messages also transport parameters (or parameter references) which particularize the operation of scrambling and unscrambling algorithms; these parameters are commonly referred to as the CW (Control Word);

the access entitlement management message service: this is a set of messages commonly called EMM "Entitlement Management Messages"; these messages are composed of data managing entitlements acquired by the user; they are used mainly for registration of entitlements purchased by the user (subscriptions, credit units, etc.) on his terminal (or the associated security processor); apart from the fact that an entitlement has to be effectively registered before the need for this entitlement appears (comparison with ECM), these messages do not require fine synchronization with the program since the EMM/program link is more logical than operational;

links between components and access conditions: each component of a program may be marketed according to specific methods, or may be even broadcast without being encoded; similarly, several components may be marketed in the same way, in other words may share the same access conditions; since these links between components/access conditions are not defined in advance and are left to the judgment of the program operator, and particularly since they are dynamic, they must be continuously described in the signal; they thus allow the terminal to find access conditions associated with the components that it has to reproduce; they are described in a set of data called "service identification" data.

the user interface in the terminal: the user interface covers a wider range than the conditional access alone, and in this case concerns firstly dialogs about the purchase of programs (pay per view, view acquired rights, etc.), and secondly the presentation of available programs, usually called the EPG (Electronic Program Guide) which in particular describes conditions for marketing future programs; the user interface shows data transported in the signal, "content" information extracted from ECMs or specific to the available programs, possibly together with data describing presentation methods (downloading the man/machine interface).

These various entities may have a general organization like that shown in the attached FIG. 3. For a program 30, there are components 32, identification of services 34, access conditions 35, entitlements management 36, the user interface 38. Data 34 are due to the use of the conditional access and data 35, 36, 38 are specific to the conditional access system used.

Some of these entities (such as identification of services in SECAM) may be implicit, or others (such as user interface data) may be missing (native presentation methods in the terminal), depending on the television and conditional access systems used. Furthermore, this model does not prejudge the codes used for these entities (analog video in D2-MAC/Packet or digital video in MPEG2/DVB, program offer by teletex in D2-MAC/Packet or in "SI EIT *** tables" in MDEG2/DVB).

If several programs coexist in the same signal and make use of various conditional access systems (case of "MULTICRYPT" in MPEG2/DVB), the general representation is then as shown in FIG. 4, which may be in two forms (a) or (b):

case "a" is direct application of the model to the coexistence of two programs in the same signal; program P1 is associated with conditional access system "a" (block 41), and program P2 is associated with conditional access system "b" (block 42);

case "b" is functionally identical to the case "a". However, links specific to the two programs P1 (block 43), P2 (block 44) are grouped in a service identification block identifying services common to the complete signal; furthermore, a complementary service 46 is created that federates the EMM flows (EMMa and EMMb), including all conditional access systems; this case "b" is a more realistic case than the MPEG2/DVB case.

FIG. 5 shows how this model can be applied to a program in SIMULCRYPT (the signal may transport other programs not shown). In this figure, program P1 comprises components and data for links 50 due to the use of the conditional access, data 52 specific to conditional access system a, and data 53 specific to conditional access system b.

This type of signal has two main special features:

each component making up the program exists only once, even if it is scrambled, the organization between components and access conditions identified by links is unique for this program, despite the coexistence of several conditional access system.

Scrambling of a component or group of components sharing the same access conditions, is particularized by a control word (CW) that configures the behavior of the scrambler and the descrambler. Therefore the ECM message for each conditional access system needs to refer to the same control words, in a synchronized manner.

This is shown in FIG. 6, which shows:

on the first line, the sequence of scrambling operations—61 with a word CWi, 62 with a word CWj, 63 with a word CWk, etc.;

on the second line, the sequence of ECMs for access system a, namely 64, 65, 66 respectively;

on the third line, the sequence of ECMs for access system b, namely 67, 68, 69 respectively;

Links between components and access conditions define which components are unscrambled and which are scrambled, and how components are distributed among the access conditions. This organization is the same for all conditional access systems to the program. All operators must build up their marketing policy based on the same program organization; for example, this makes it impossible for a television program to be marketed simultaneously by an operator using an organization in which the image is accessible by subscription and the sound and subtitle are unscrambled, and by another operator using an organization in which the image and sound are accessible by subscription and the subtitle is unscrambled, and by a third operator using an organization in which the image and sound are accessible by subscription, and the subtitle is accessible in "pay per view".

This common organization is shown diagrammatically in FIG. 7, which shows a program P with:

components 70, links 71, first conditional access conditions A, referenced 72, second conditional access conditions B, referenced 73.

Components 70 and links 71 are imposed on all operators. Conditional access system 72 is defined by operator A, and conditional access system 73 is defined by operator B.

These two specific features (unique control words and unique relations between components/access conditions)

create very close links between operators sharing the same program in SIMULCRYPT. An analysis of the role of operators involved shows that some of them may find asymmetry a constraint.

One of the operators, called the "master operator", is the supplier of the program materialized by its components. By controlling the source, he controls the first marketing of the program. He thus imposes the control words used and the relations between components and access conditions. He can market the components either in groups or separately, leave some components unscrambled, etc. Since he has full control over the source, he can also synchronize changes in his marketing with time and chaining of programs; unscrambled periods, change in the cost of a program, etc.

Other operators, called "secondary operators" must accept the use of the control words used by the master operator. Furthermore, they must match their marketing of components to the marketing policy decided by the master operator. Finally, since they do not directly control programming of programs, these secondary operators have to deal with the problem of synchronization with program changes.

In the past, SIMULCRYPT was used at the master operator encoding point accessed by secondary operators. This imposes several conditions:

an architecture adapted to SIMULCRYPT at the encoding point; in particular, this architecture must include— internal distribution of control words, it must have multiple conditional access data inputs (several flows of ECM or EMM data, etc.) and it must offer synchronization mechanisms to operators;

the location of ECM message generators at the master operator, in order to be provided with control words (these may be difficult to place elsewhere due to their strategic role and the risks of pirating); these generators may include secrets specific to each operator;

a control/checking type access for each operator to define access conditions for his own marketing; if master operator controls this access, it can optimize synchronization between marketing of programs and program sequencing; this access may also make it necessary for secondary operators to be present in the master operator's premises;

centralized creation of the signal transporting a program marketed by several operators; this functional organization is badly adapted to the case of "overselling" a program received by satellite in independent cable networks.

It can be understood that these very close relations in which the master operator plays a predominant role, may be a nuisance to secondary operators placed in a "slave" position that is particularly difficult to accept since it affects the marketing and competitive strategy of each.

The purpose of this invention is to overcome this disadvantage, by reducing this control over secondary operators.

DESCRIPTION OF THE INVENTION

In order to limit dependence relations between the master operator and secondary operators, the creation of a program is separated from its transfer into SIMULCRYPT. Due to the very nature of SIMULCRYPT, the preponderant role of the master operator cannot be eliminated since the master operator controls the program source, but this preponderance may be attenuated by the use of self-contained equipment enabling a secondary operator to apply his own SIMULCRYPT; the dependence relation between the master operator and the secondary operator is then reduced to the secondary operator purchasing a program from the master operator, which is a situation similar to what occurs when using the operation called "transcontrol".

More precisely, the purpose of this invention is a process for assigning a complementary conditional access to a television program already in conditional access, this television program initially comprising:

video and/or sound and/or data components, scrambled according to a first conditional access system, the scrambling operation making use of cryptographic processing using control words, entitlement control messages expressing the conditions for marketing the program, entitlement management messages composed of data managing entitlements acquired by the user, and possibly a set of data identifying services offered and/or extending the description of the program offer, characterized by the fact that:

this program is received in means containing access entitlements corresponding to the first conditional access system, the control words used for scrambling are reproduced, complementary access control messages are calculated starting from these reproduced control words, taking account of the conditions of the complementary conditional access system, and complementary access control messages are built up, complementary entitlement management messages are produced specific to the complementary conditional access system, possibly together with a complementary set identifying services offered in the complementary conditional access system, the program is rebroadcast with its components unchanged, its access control messages and its entitlement management messages unchanged, and possibly all initial television program data identifying offered services and/or adding to the description of offered programs, and complementary access control messages, complementary entitlement management messages, and possibly the set of complementary data specific to the complementary conditional access system, are added.

Another purpose of this invention is equipment for embodiment of this process.

DETAILED DESCRIPTION OF AN EMBODIMENT

Figure 1:
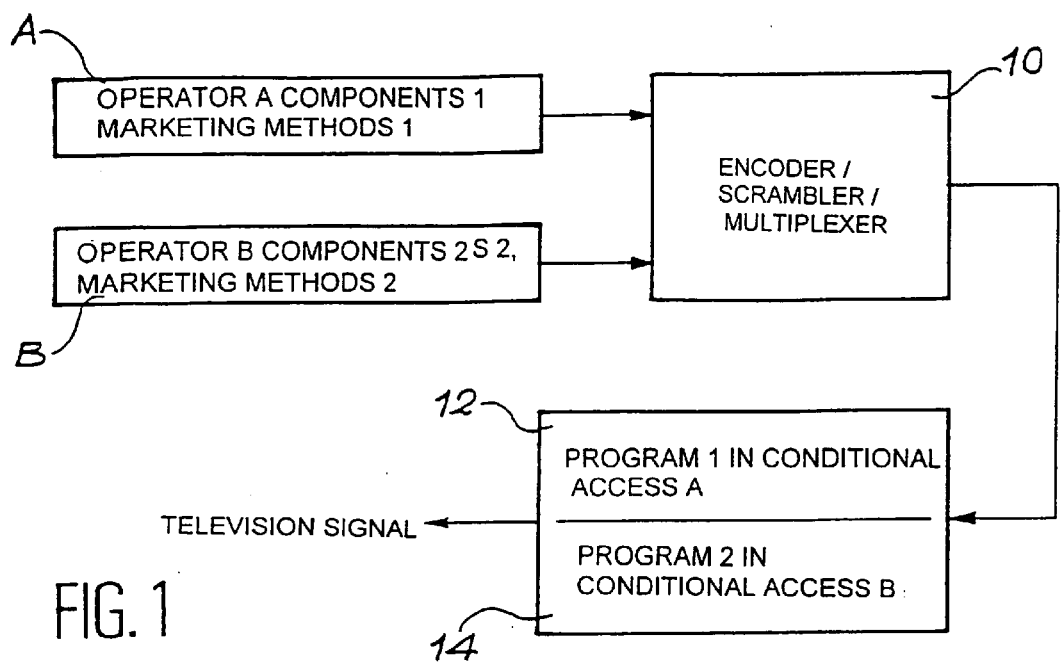
FIG. 1, already described, illustrates the known MULTI-CRYPT process that can be used to obtain two programs, each having a conditional access system.
Figure 2:
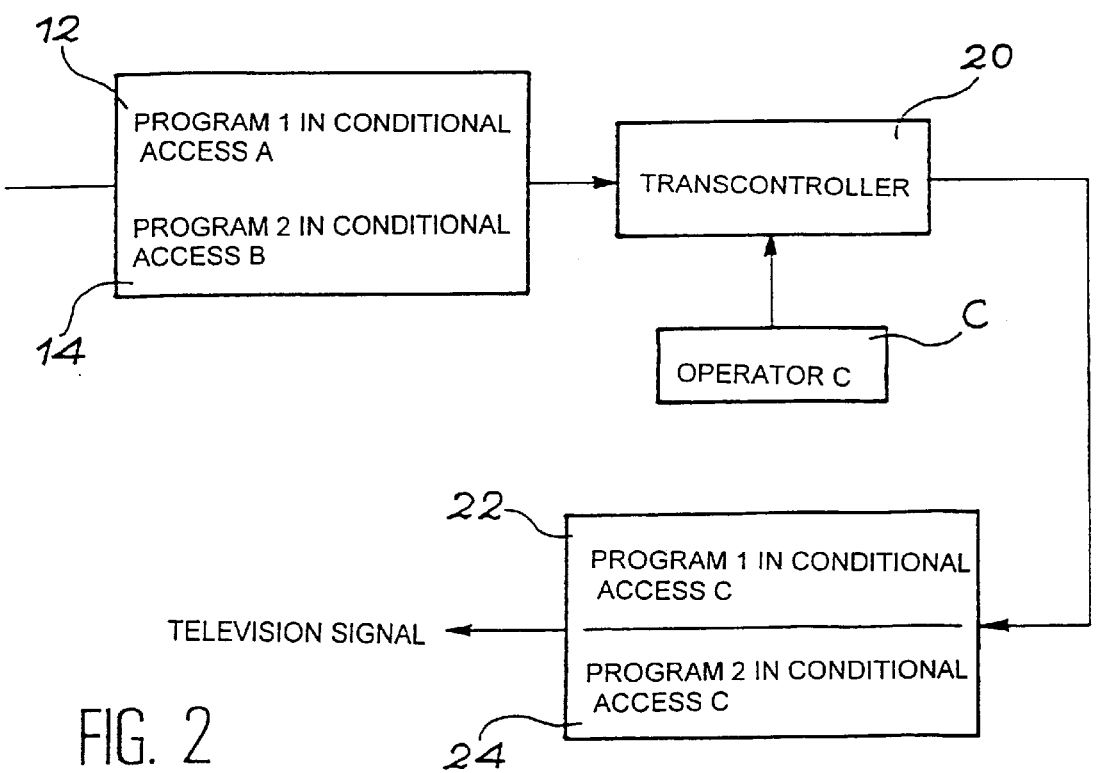
FIG. 2, already described, illustrates a transcontrol process.
Figure 3:
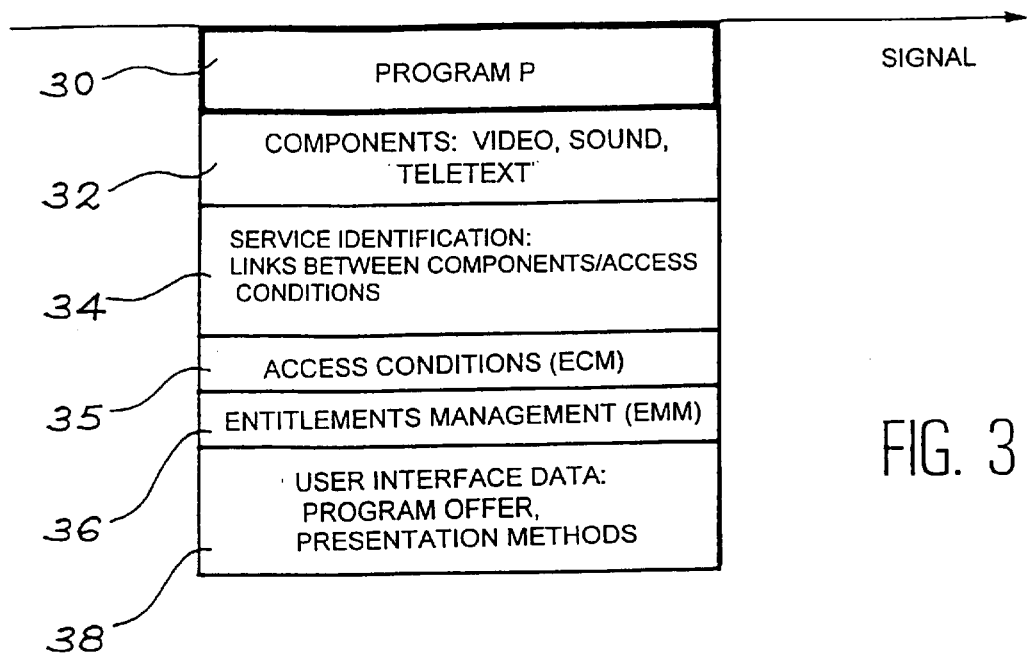
FIG. 3, already described, illustrates the structure of a program in conditional access.
Figure 4:
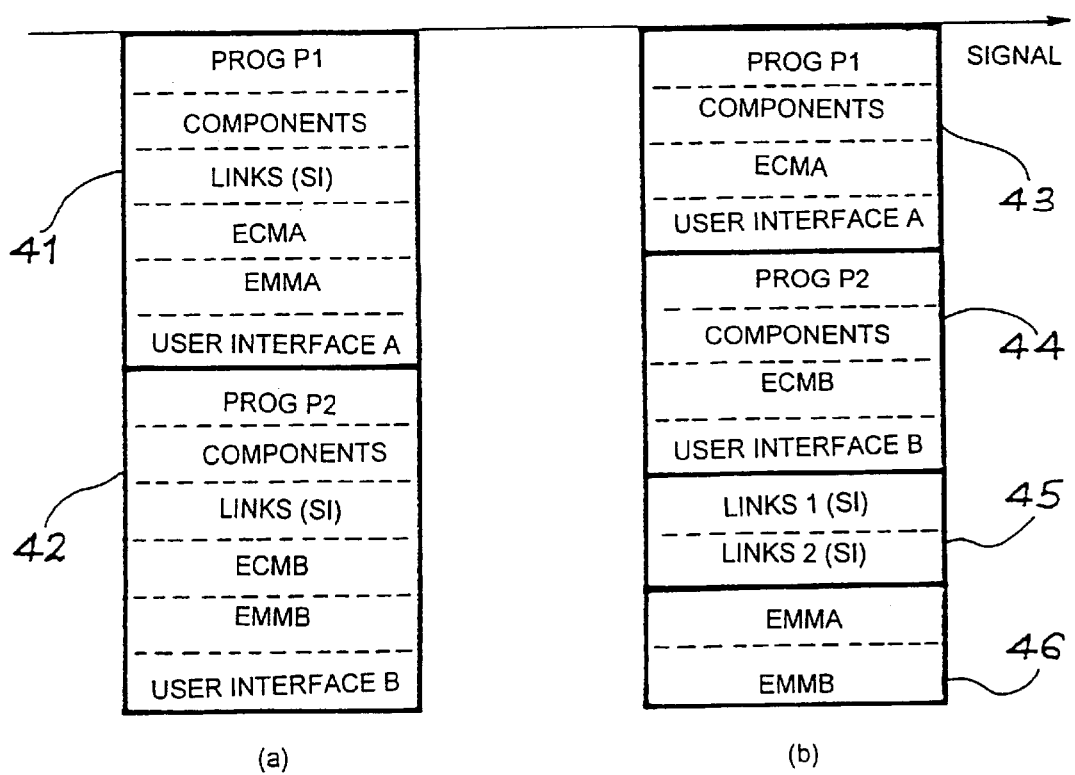
FIG. 4, already described, shows two variant embodiments of the MULTICRYPT process with two programs and two conditional access systems.
Figure 5:
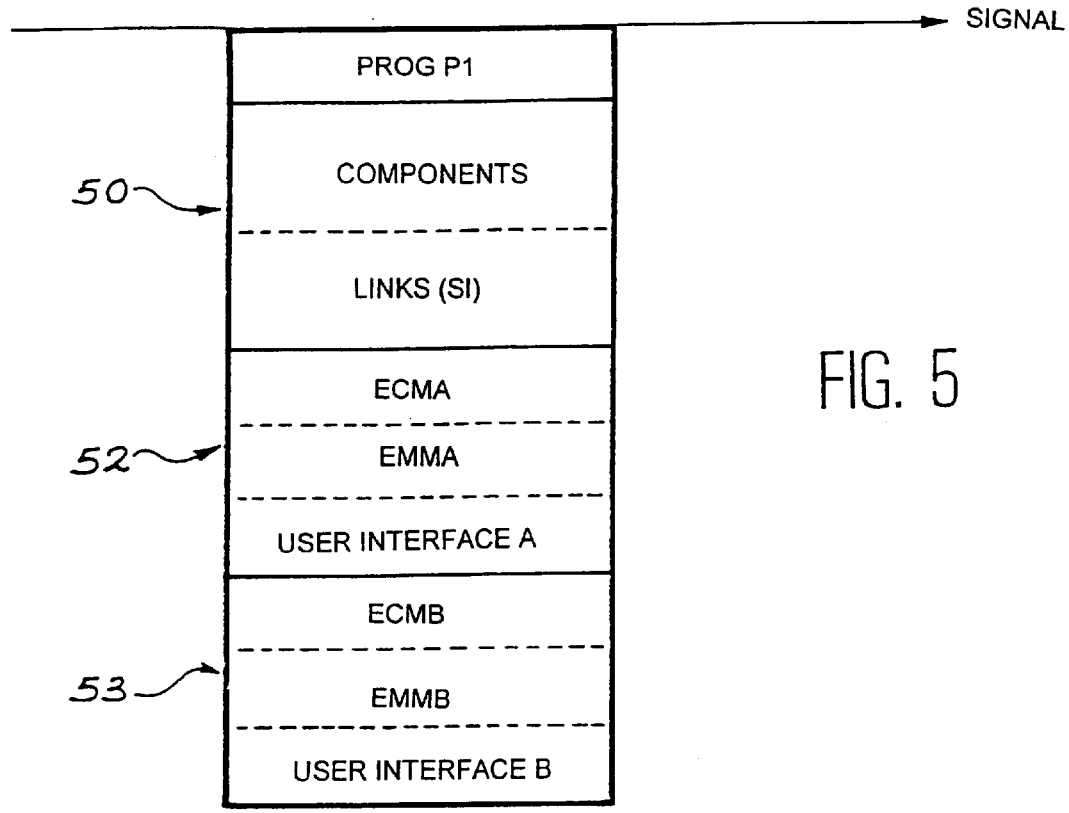
FIG. 5, already described, illustrates an example embodiment of the SIMULCRYPT process, with two conditional access systems for the same program.
Figure 7:
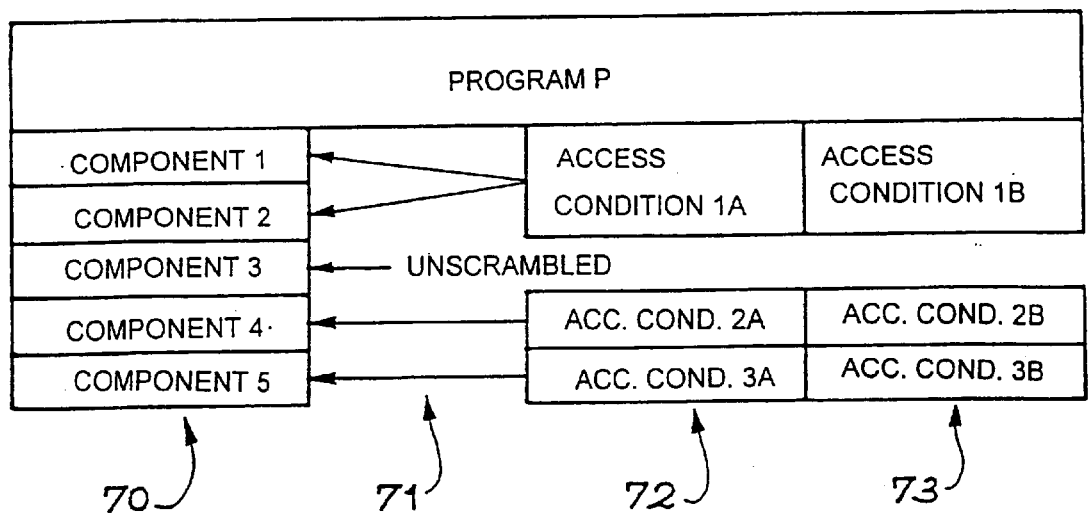
FIG. 7, already described, illustrates the general organization of a program in SIMULCRYPT and constraints imposed on operators.
Figure 6:
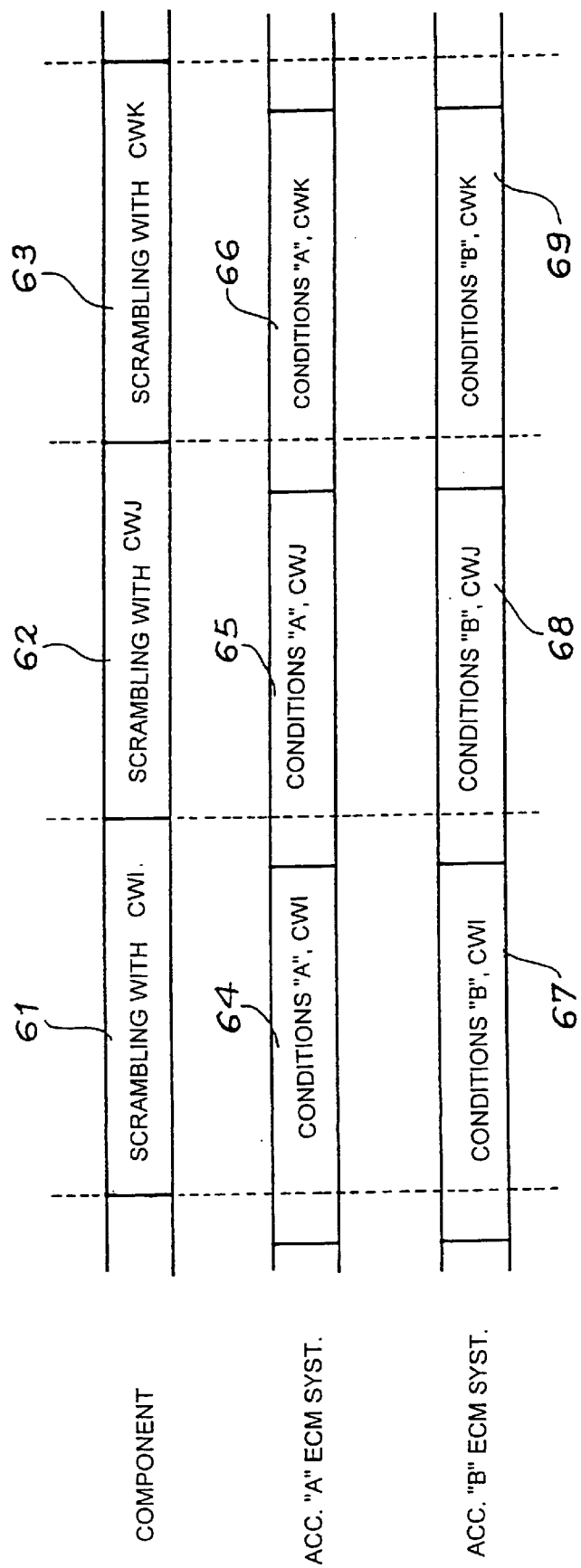
FIG. 6, already described, illustrates synchronization between scrambling and messages of each conditional access system in SIMULCRYPT.
Figure 8:
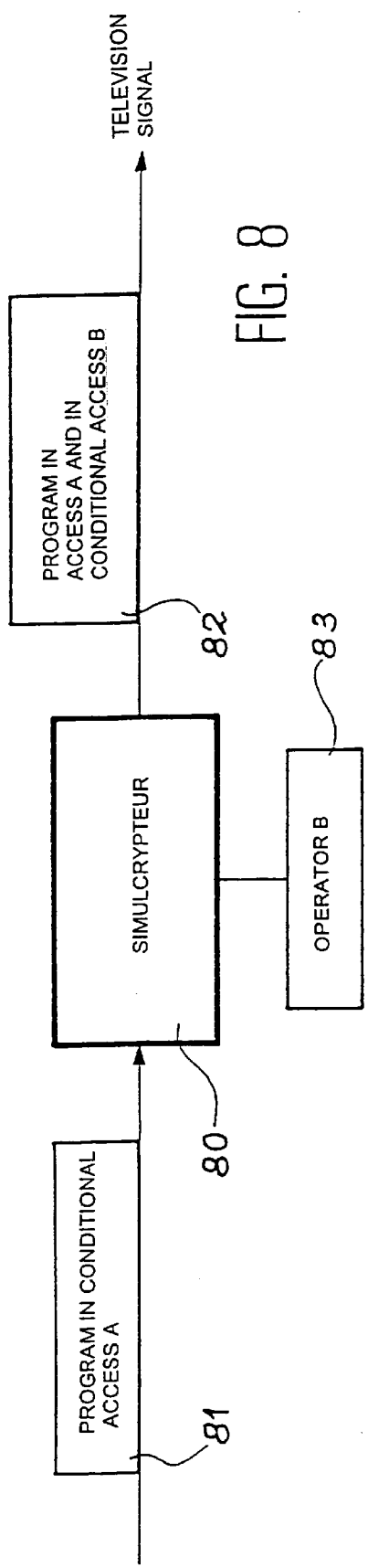
FIG. 8 is a general diagram showing the place of equipment conform with the invention (SIMULCRYPTEUR)

FIG. 8 shows equipment 80, called the SIMULCRYPTEUR, conform with this invention, which receives a program 81 already in conditional access A and outputs a program 82 in conditional access A and in conditional access B. This conditional access B was inserted by an operator 83.

Figure 9:
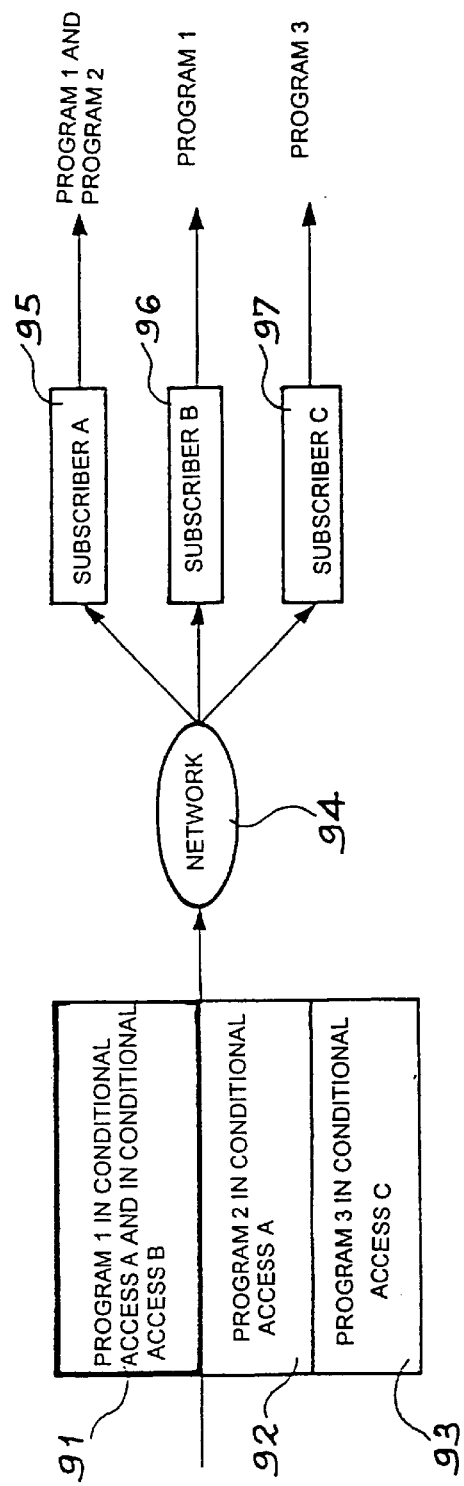
FIG. 9 illustrates an example use of a television signal formed by the process according to the invention.

The signal finally obtained may be used as shown in FIG. 9. On this figure, this program denoted 1 is marked as reference 91 and it is associated with other conventional programs such as a program 2 in conditional access A (reference 92) and a program 3 in conditional access C (reference 93). All these programs are transported by a network 94 and are distributed:
- to a subscriber 95 who has access entitlements A and can thus receive program 1 and program 2,
- to a subscriber 96 who has access entitlements B and who can thus receive program 1,
- to a subscriber 97 with access entitlements C and that can receive program 3.

The subscriber 96 thus benefits from the process according to the invention, so that he can access program 1 although this program was originally only in conditional access A. Due to the invention, this program then became accessible to subscriber B by adding a complementary conditional access system B.

Figure 10:
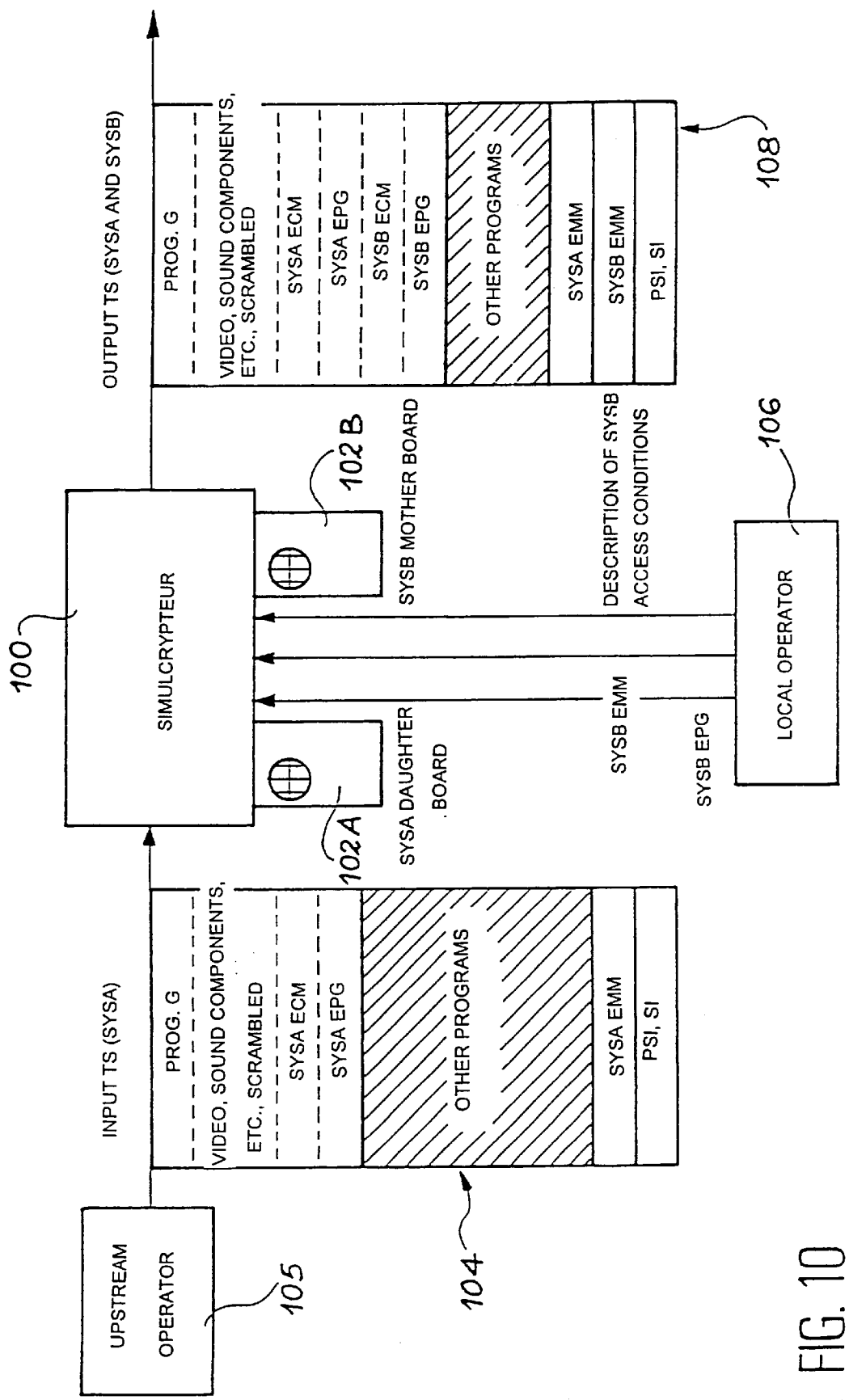
FIG. 10 illustrates the function carried out by the equipment according to the invention.

FIG. 10 illustrates the process and equipment according to the invention in more detail. The equipment according to the invention, called SIMULCRYPTEUR, is marked with reference 100. It is equipped with a daughter board 102A adapted to the access control system A belonging to the upstream operator 105, and a mother board 102B adapted to an access control system B belonging to the local operator 106. The SIMULCRYPTEUR 100 receives a program, the structure of which is described by block 104. This program is produced by the upstream operator 105, who uses access control system A. The SIMULCRYPTEUR 100 works with a local operator 106 and produces a program, the structure of which is described by block 108.

The various signals shown in FIG. 10 correspond to the MPEG2/DVB context. Transposition to other technical contexts is a simple matter for an expert in the subject. The abbreviations used in FIG. 10 have the following meanings:
- TS: Transport Stream—as defined in the MPEG2/DVB standard, after demodulation and decoding of the channel for the incoming signal and before modulation and encoding of the channel for the outgoing signal; a SIMULCRYPTEUR equipment may be provided with a demodulation stage and a modulation stage to interface with upstream and downstream networks, without changing the general function.
- SysA, SysB: represent two distinct conditional access systems; they may represent the same conditional access system, in which case they are differentiated by a specific embodiment (for example two different crypto-algorithms); the first system, SysA, is related to the upstream operator 105, and the second, SysB, is the complementary system added to the program and related to local operator 106.
- PSI, SI: service identification data; PSI tables like those specified by MPEG2 and SI tables like those specified by DVB.
- EPG: Electronic Program Guide—all data completing the description of the program offer (complement or replacement to SI tables); these data may include the description of presentations to the terminal user.

The daughter board 102A is a security processor comprising entitlements acquired by the local operator, who behaves like a customer of the upstream operator; after comparing its rights with access conditions contained in incoming SysA ECMs, the daughter board initiates cryptographic processing to reproduce each control word CW.

The mother board 102B is a security processor placed under the control of the local operator; it performs cryptographic processing used for the creation of SysR ECMs produced locally.

This processing is illustrated for the case of a single program, but may be applied to several programs in the same TS.

An incoming program in conditional access denoted SysA (in other words in MULTICRYPT) is completed in SIMULCRYPT by the SysB conditional access messages. The initial SysA messages are not modified and are reproduced unchanged in the equipment output signal. The purpose is that the SIMULCRYPT principle should be applied in full so that the program remains accessible to a population equipped for SysA and can also be accessible to another population through the SysB system.

Therefore, application of SIMULCRYPT consists of adding all data (ECM, EMM, signals, private data) related to the SysB system and to the corresponding program offer, to the signal.

The following signal elements are concerned by the process according to the invention:
- program components: their characteristics (coding, contents, unscrambled or scrambled, association with access conditions) remain unchanged;
- ECM access conditions: SysA ECMs associated with the program remain unchanged and correspond to the marketing choices made by the upstream operator; the SIMULCRYPTEUR adds SysB ECMs consistent with program components (same control word CW) and the marketing choices made by the local operator;
- EMMs: SysA EMMs transported in the signal remain unchanged; the SIMULCRYPTEUR adds SysB EMMs defined by the local operator according to his own customer management strategy and generated by a chain of local entitlements;
- signaling:
  - the contents of PSI tables (PMT and CAT) must be adapted to maintain access to SysA ECM and EMM data, and also to enable access to SysB ECM and EIM data;
  - the contents of SI tables need to be adapted to maintain the description of the upstream operator's service offer and to add the description of the local operator's service offer; some tables directly concerned refer to conditional access (for example description of the program cost); other tables are not directly concerned by "simulcrypting", but may be modified within the framework of the reorganization of the service offer, of which "simulcrypting" is one element;

private data: the use of SysB may make it necessary to insert private data (individual messages, etc.) locally.

Figure 11:
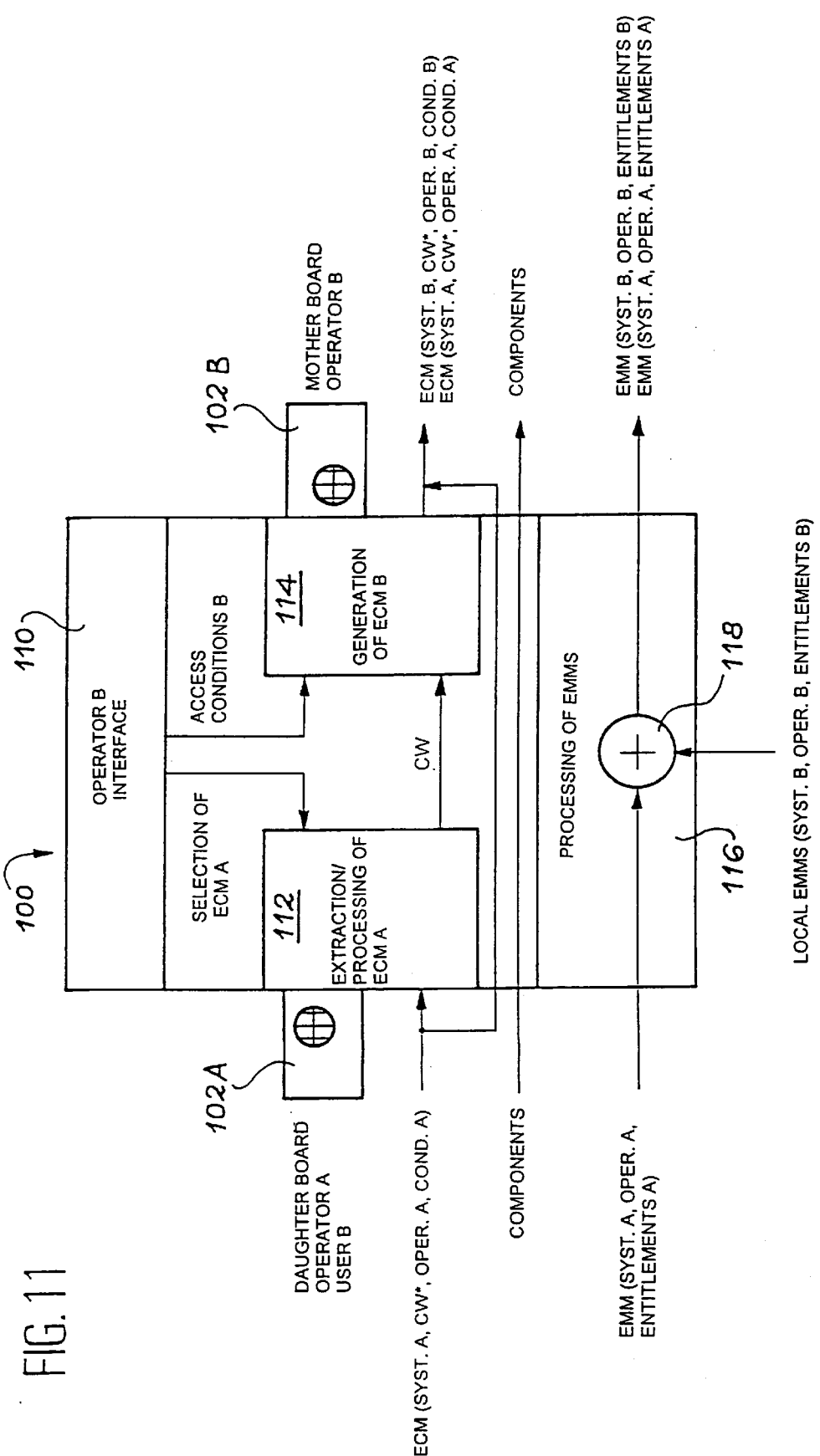
FIG. 11 shows the functional organization of equipment conform with the invention.

Processing of ECMs and EMMs in a SIMULCRYPTEUR is illustrated in FIG. 11. The figure shows equipment 100, the daughter board 102A, and the mother board 102B. It also shows an interface 110 for an operator B, a type A ECM extraction and processing circuit 112, a type B ECM generation circuit 114, an EMM processing circuit 116, with an OR gate 118 into which local EMMs are input.

These ECM processing means comprise three parts:

selection of ECMs: the objective is to define which services and which components in a service are to be processed; depending on the variants, these choices may be implicit (all services, the image and the first sound, etc.) or explicit and made by the operator by interpretation of PSI/SI data;

processing of incoming ECMs: these ECMs are extracted and input to the daughter board 102A to extract current CW words from them; in this respect, the equipment is a decoder and a client of operator A; these ECMs are then directed towards the output;

processing of output ECMs: these ECMs are calculated using the mother board 102B belonging to operator B and take account of access conditions defined by operator B and current control words CW extracted from the input ECMs; output ECMs are added to input ECMs.

Processing of EMMs consists either of allowing input EMMs to pass transparently, or eliminating them and possibly adding EMMs belonging to operator B. Furthermore, input EMMs are applied to the daughter board for the management of daughter board rights. The same is true for EPG data, if there are any.

A SIMULCRYPTEUR requires real time processing to update the signaling (PSI/SI tables) and possibly to build in local private data (EPG), and is no problem for an expert in the subject.

This modification of the signal in real time is similar to the modification made by another type of equipment called the transmodulator, which adapts an existing signal when it passes from one network (for example satellite) to another (for example cable): extract tables, modify them, insert their new version in the signal. Even if the details of the processing to modify the tables are different (action on the PMT and CAT contents, etc.), these extraction and insertion functions are comparable.

What is claimed is:

1. Process for assigning a complementary conditional access to a television program already in conditional access, this television program initially comprising:

video and/or sound and/or data components, scrambled according to a first conditional access system (SysA), the scrambling operation making use of cryptographic processing using control words (CW), entitlement control messages (SysA ECM) expressing the conditions for marketing the program, entitlement management messages (SysA EMM) composed of data managing entitlements acquired by the user, and possibly a set of data identifying services offered (PSI, SI) and/or extending the description of the program offer, characterized by the fact that:

this program is received in means containing access entitlements corresponding to the first conditional access system (SysA), the control words (CW) used for scrambling are reproduced, complementary access control messages (SysB ECM) are calculated starting from these reproduced control words (CW), taking account of the conditions of the complementary conditional access system (SysB), and complementary access control messages are built up (SysB ECM), complementary entitlement management messages (SysB EMM) are produced specific to the complementary conditional access system (SysB), possibly together with a complementary set (SysB EPG) identifying services offered in the complementary conditional access system, the program is rebroadcast with its components unchanged, its access control messages (SysA ECM) and its entitlement management messages (SysA EMM) unchanged, and possibly all initial television program data identifying offered services and/or adding to the description of offered programs, and complementary access control messages (SysB ECM), complementary entitlement management messages (SysB EMM), and possibly the set of complementary data (SysB EPG) specific to the complementary conditional access system (SysB), are added.

2. Equipment for assigning a complementary conditional access to a television program already in conditional access according to the process in claim 1, characterized by the fact that it comprises:

means (102A) containing access entitlements corresponding to the first conditional access system (SysA), means (112) capable of reproducing the control words (CW) used for scrambling, means (102B, 114) for calculating complementary access control messages (SysB ECM) starting from these reproduced control words (CW), taking account of the conditions of the complementary conditional access system (SysS), and complementary access control messages (SysB ECM) are built up, means (106) of producing complementary entitlement management messages (SysB EMM) specific to the complementary conditional access system (SysB), and possibly a complementary set (SysB EPG) identifying services offered in the complementary conditional access system (SysB), this equipment being used to rebroadcast the program with its components unchanged, its access control messages (SysA ECM), and its entitlement management messages (SysA EMM) unchanged and, if applicable, all data for the initial television program identifying services offered and/or additional to the program offer description, by adding the complementary access control messages (SysB ECM), the complementary entitlement management messages (SysB EMM), and if applicable, the complementary set of data (SysB EPG) specific to the complementary conditional access system (SysB).

3. Equipment according to claim 2, characterized by the fact that the means (102B) containing the access entitlements corresponding to the first conditional access system (SysA) and the means (102B, 114) for taking account of the complementary conditional access system. (SysB) are each produced by a security processor.

* * * * *